United States Patent [19]

Yorozu et al.

[11] Patent Number: 4,916,649

[45] Date of Patent: Apr. 10, 1990

[54] METHOD AND APPARATUS FOR TRANSFORMING A BIT-REVERSED ORDER VECTOR INTO A NATURAL ORDER VECTOR

[75] Inventors: Jun-Ichi Yorozu; Norio Masuda, both of Tokyo, Japan

[73] Assignee: NEC Corporation, Tokyo, Japan

[21] Appl. No.: 225,353

[22] Filed: Jul. 28, 1988

[30] Foreign Application Priority Data

Jul. 29, 1987 [JP] Japan .................................. 62-187814

[51] Int. Cl.⁴ .......................................... G06F 15/332
[52] U.S. Cl. .................................................. 364/726
[58] Field of Search ......................................... 364/726

[56] References Cited

U.S. PATENT DOCUMENTS

| | | | |
|---|---|---|---|
| 3,731,284 | 5/1973 | Thies | 364/726 |
| 3,862,406 | 1/1975 | Brooks | 364/726 |
| 3,988,601 | 10/1976 | Perry | 364/726 |
| 4,602,350 | 7/1986 | Gray | 364/726 |

Primary Examiner—David H. Malzahn
Attorney, Agent, or Firm—Foley & Lardner, Schwartz, Jeffery, Schwaab, Mack, Blumenthal & Evans

[57] ABSTRACT

A method and apparatus of transforming a bit-reversed order vector into a natural order vector in a vector processing system. The invention includes a main memory having a multi-bank system, stored optimal access-address interval information, bit-reversed order sequence circuitry, and permutation circuitry. The invention executes bit-reversal processing without giving rise to bank conflict.

3 Claims, 5 Drawing Sheets

FIG. 4

| NUMBER OF BANKS / VECTOR LENGTH | 128 | 256 | 512 | 1024 |
|---|---|---|---|---|
| 2 | 1 | 1 | 1 | 1 |
| 4 | 1 | 1 | 1 | 1 |
| 8 | 1 | 1 | 1 | 1 |
| 16 | 1 | 1 | 1 | 1 |
| 32 | 1 | 1 | 1 | 1 |
| 64 | 1 | 1 | 1 | 1 |
| 128 | 2 | 1 | 1 | 1 |
| 256 | 4 | 2 | 1 | 1 |
| 512 | 9 | 4 | 2 | 1 |
| 1024 | 17 | 9 | 4 | 2 |
| 2048 | 33 | 17 | 9 | 4 |
| ⋮ | ⋮ | ⋮ | ⋮ | ⋮ |

METHOD AND APPARATUS FOR TRANSFORMING A BIT-REVERSED ORDER VECTOR INTO A NATURAL ORDER VECTOR

BACKGROUND OF THE INVENTION

The invention relates to a method of transforming a bit-reversed order vector stored in a main memory unit (MMU) of a vector processing system into a natural order vector.

FIG. 5 is a diagram for explaining how a calculation of the fast Fourier transform (FFT) is done by the use of a vector processing system according to the method disclosed in a paper entitled "An Adaptation of the Fast Fourier Transform for Parallel Processing" by Marshall C. Pease, published in the Journal of the Association for Computing Machinery, Vol. 15, No. 2, April issue, 1968, pp. 252-264. It is supposed that an input vector consisting of eight vector elements $X(0)$, $X(1)$, $X(2)$, $X(3)$, $X(4)$, $X(5)$, $X(6)$ and $X(7)$ of eight bits each is stored in a MMU of a vector processing system. These elements $X(0)$ to $X(7)$ are stored in eight consecutive storage locations of the MMU at which, for instance, addresses 0 to 7 are assigned, respectively. The elements $X(0)$ to $X(3)$ are loaded into one vector register of the system and the elements $X(4)$ to $X(7)$ are loaded into another vector register of the system.

Next, a first pair of $X(0)$ and $X(4)$, a second pair of $X(1)$ and $X(5)$, a third pair of $X(2)$ and $X(6)$, and a fourth pair of $X(3)$ and $X(7)$ are successively supplied pair by pair from the two vector registers to the vector processing section of a system in which each of the pairs is subjected to different first and second operations. The results of the operations are successively stored into the storage locations of addresses 0 to 7. Specifically, the results of the first operation on the first to fourth pairs are stored into the storage locations of addresses 0, 2, 4 and 6, respectively, and those of the second operation on the first to fourth pairs are stored into the storage locations of addresses 1, 3, 5 and 7, respectively. The contents of the storage locations are again loaded into the two vector registers, and the same process is repeated. A vector consisting of elements $A(0)$, $A(4)$, $A(2)$, $A(6)$, $A(1)$, $A(5)$, $A(3)$ and $A(7)$ ultimately obtained in the storage locations of addresses 0 to 7 is a bit-reversed order vector. Therefore, the following bit reversal processing is required. Namely, the elements of the bit-reversed order vector are permutated to obtain a natural order vector having the elements $A(0)$, $A(1)$, $A(2)$, $A(3)$, $A(4)$, $A(5)$, $A(6)$ and $A(7)$ arranged in that order. First, there is formed a sequence of integer numbers $[0, 1, 2, 3, 4, \ldots, N-1]$ (where N represents the length of the bit-reversed order vector, or the number of its vector elements). If N is 8, there will be obtained a sequence of $[0, 1, 2, 3, 4, 5, 6, 7]$, which can be represented in binary notation as a binary sequence of [000, 001, 010, 011, 100, 101, 110, 111]. By permutating the order of bits in each three-bit string ($a_3a_2a_1$) in the binary sequence, there is obtained a sequence of [000, 100, 010, 110, 001, 101, 011, 111] in which each three-bit string is a string ($a_1a_2a_3$). The sequence thus obtained can be represented in decimal notation as a sequence of $[0, 4, 2, 6, 1, 5, 3, 7]$. Permutation vector consisting of such a sequence is stored in advance in the MMU. In a permutating process, with the elements (0, 4, 2, 6, 1, 5, 3, 7) of the permutation vector being used as addresses, the elements $A(0)$, $A(1)$, $A(2)$, $A(3)$, $A(4)$, $A(5)$, $A(6)$ and $A(7)$ in the storage locations of addresses 0, 4, 2, 6, 1, 5, 3 and 7 are loaded into a vector register in this order for transfer from this vector register into a desired area in the MMU.

Since the MMU is usually composed of a plurality of banks each permitting independent access, access to vector elements stored in different banks can be made simultaneously. Generally, the number of banks is a power of 2, resulting in frequent occurrences of bank conflict (simultaneous access requests to the same bank) in the above-mentioned permutating process. For instance, if the number of banks is four, the order of addresses designated by the permutation vector is an order of addresses 0, 4, 2, 6, 1, 5, 3 and 7 in the above-mentioned permutating process. In this case, addresses 0 and 4, addresses 2 and 6, and addresses 3 and 7 belong to the same banks, respectively, and access to the two addresses of each of the address pairs is made consecutively to avoid a bank conflict. A bank conflict brings about a substantial increase in data transfer time due to waiting for memory access.

An object of the present invention is, therefore, to provide a method free from the disadvantage mentioned above.

SUMMARY OF THE INVENTION

An object of the present invention is, therefore, to provide a method free from the disadvantage mentioned above.

According to an aspect of the invention, there is provided a method of transforming a bit-reversed order vector into a natural order vector in a vector processing system. The system comprises: a multibank main, memory unit including a first vector storage area for holding the bit-reversed order vector, a second vector storage area for storing the natural order vector, a permutation vector storage are for holding a permutation vector, a bank number information storage area for holding bank number information indicative of the number of banks constituting said memory unit, and an interval value storage area for holding respective optimal access-address-interval values for respective, pairs of a vector length and a banks' number and first and second vector registers. The method comprises the following steps:

(a) taking out of the interval value storage area one of the optimal access-address-interval values j designated by one of the above-mentioned pairs corresponding to the bank number information and the length of the bit-reversed order vector;

(b) loading into said first vector register from the i-th vector element of the permutation vector every j vector elements;

(c) loading into the second vector register the vector elements of the bit-reversed order vector designated by the vector elements loaded into the first vector register;

(d) storing the vector elements loaded into said second vector register into from the i-th storage location of the second vector storage area every j storage locations; and (e) determining whether or not the processing of said steps (b) to (d) has been repeated j times and, if not, returning to the step (b) with the value of i being increased by one.

BRIEF DESCRIPTION OF THE DRAWINGS

Other features and advantages of the invention will become apparent from the following detailed description when taken in conjunction with the accompanying drawings, in which:

FIG. 4 is a diagram showing a table for determining an optimal access-address interval.

In the drawings, the same reference numerals represent the same structural elements.

DETAILED DESCRIPTION OF THE PREFERRED EMBODIMENT

The invention is for use in, for instance, the vector processing systems disclosed in the U.S. Pat. No. 4,128,880 and the U.S. Pat. No. 4,710,867.

Figure 1:
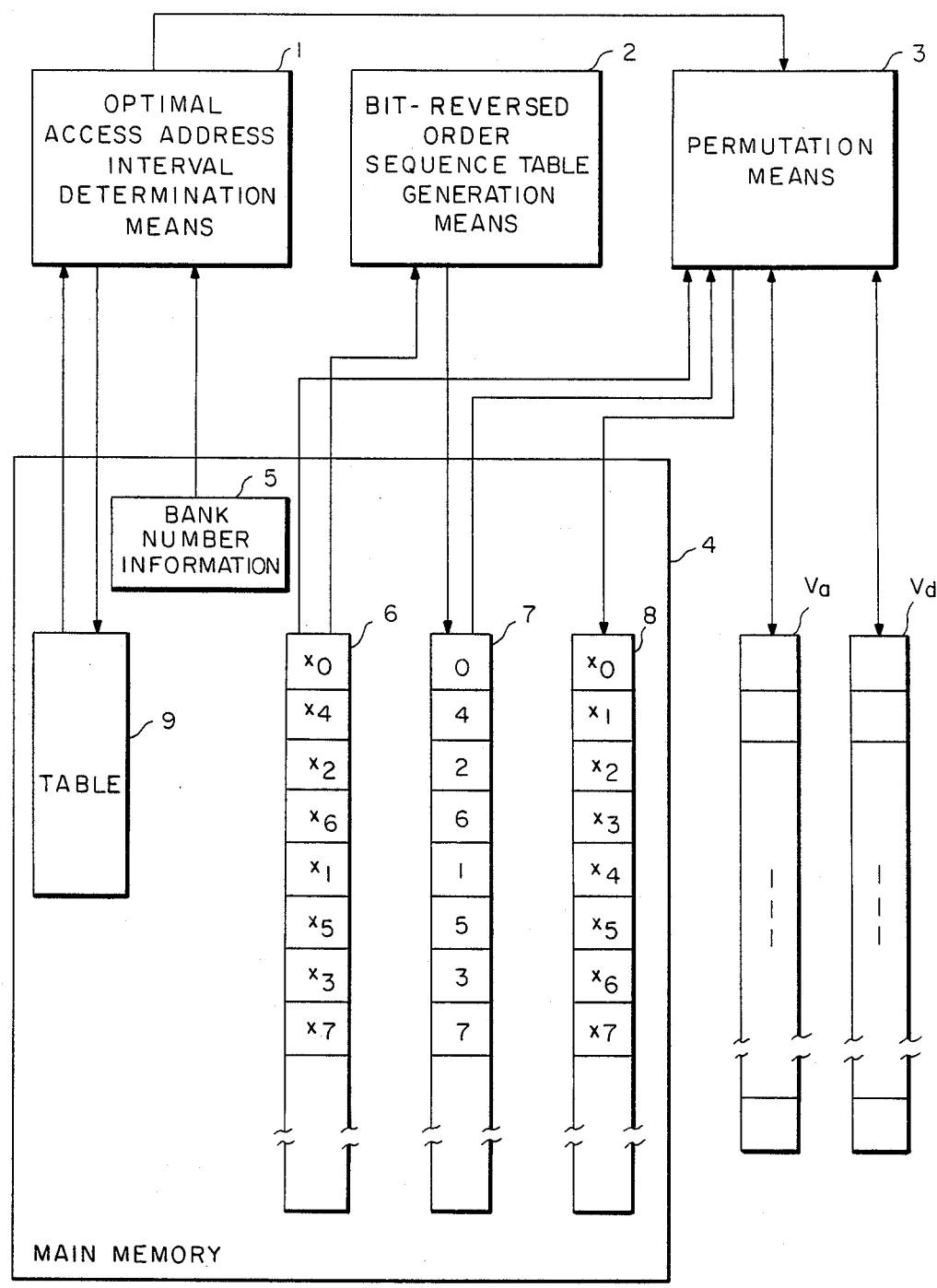
FIG. 1 is a block diagram of a preferred embodiment of the invention.

Referring to FIG. 1, a preferred embodiment of the invention comprises optimal access-address interval determination means 1, bit-reversed-order-sequence-table generation means 2, permutation means 3, main memory means 4 having a multi-bank system comprising a plurality of banks, respective accesses to which can be made independently of each other, and vector registers Va and Vd. The, permutation means 3 and the registers Va and Vd may be, for instance, a main memory 3 and vector registers V0 and V1 disclosed in the U.S. Pat. No. 4,710,867. The determination means 1, the generation means 2 and the permutation means 3 are constituted by a program executed by a vector processing system as disclosed in the U.S. Pat. No. 4,710,867. The memory means 4 includes a bank number information storage area 5, a first vector storage area 6 for storing a first vector, a second vector storage area 8 for storing a second vector, and a permutation vector storage area 7 for storing a permutation vector. Each of the first vector, the second vector and the permutation vector storage areas include a plurality of vector elements of eight bytes each. The memory means 4 further includes a table storage area 9.

Next, operation of the embodiment will be described.

The generation means 2 performs the bit-reversal processing on the basis of the length N ($=2^M$, where M is a positive integer number) of the first vector stored in the storage area 6, that is, the number of vector elements contained in the first vector, and stores the resultant bit-reversed order vector into the storage area 7. In FIG. 1, the vector length N is eight ($=2^3$). Thus, when a number of eight is given as the vector length N, a sequence of integer numbers [0, 1, 2, 3, 4, 5, 6, is generated from a sequence of [0, 1, 2, . . . , N−1]. This sequence of integer numbers is subjected to the bit-reversal processing given to another sequence of integer numbers [0, 4, 2, 6, 1, 5, 3, 7], which is stored into the storage area 7 as a permutation vector.

The determination means 1, as will be described below, determines an optimal access-address-interval ID on the basis of bank number information indicative of the number of banks constituting the memory means 4, and the vector length N. In the embodiment, it is supposed that the number of banks is four, and that a number of two is obtained as the interval ID on the basis of this number of banks and the vector length N ($=8$). The permutation means 3 is notified from the means 1 of the obtained interval ID as optimal access-address-interval information.

Figure 2:
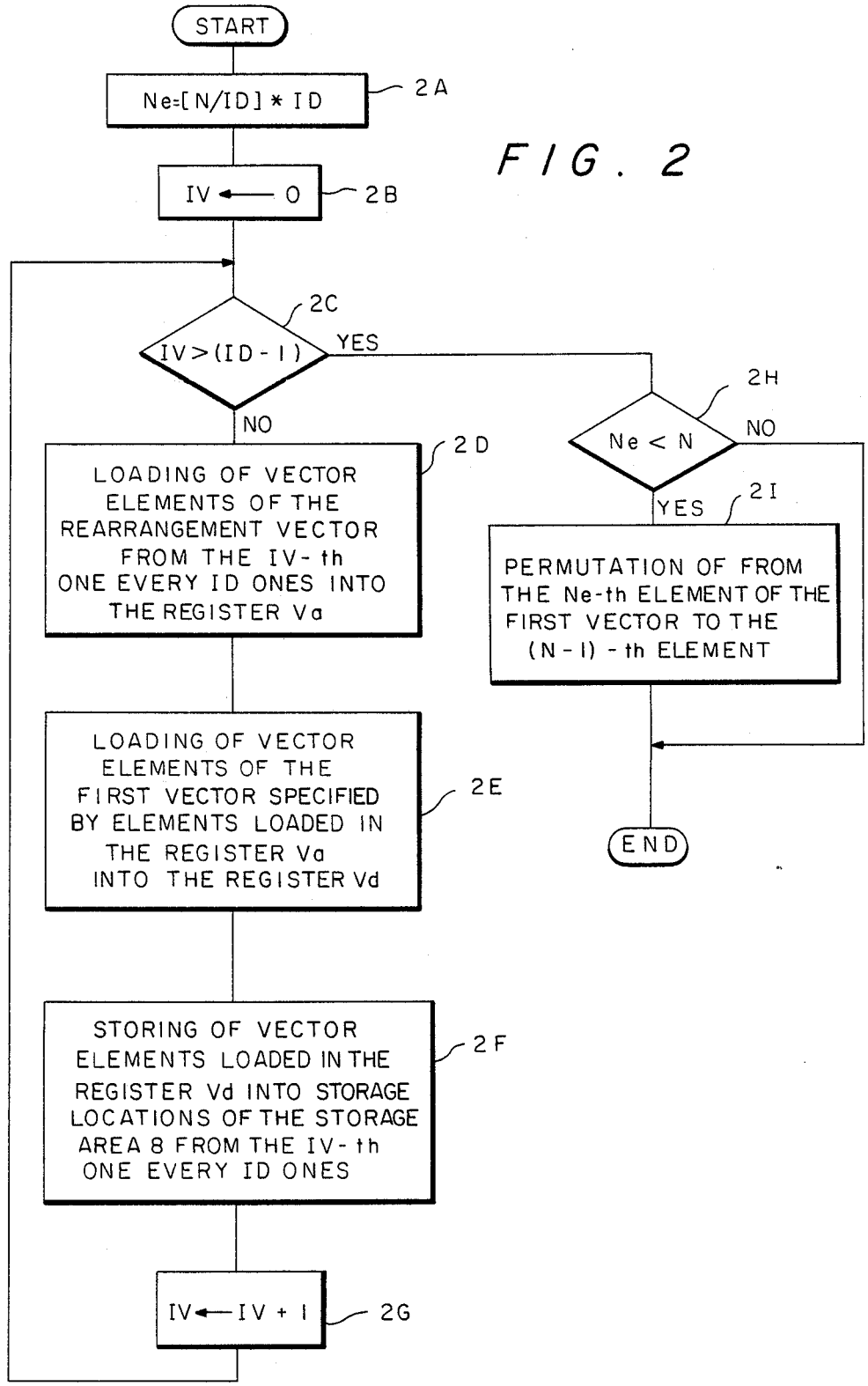
FIG. 2 is a flow chart illustrating the operation of the embodiment.

The permutation means 3 performs processing as shown in FIG. 2.

First, at step 2A, there is calculated from a formula of [N/ID] *ID the position Ne of the vector element immediately succeeding the last vector element of the first vector to undergo a first permutation processing performed at step 2D to step 2F (where [x] means the largest integer not to exceed x).

Then, after zero is set to a variable IV at step 2B, the value of the variable IV and the result (ID−1) of subtraction of one from the interval ID are compared at step 2C, and the processing of step 2D is performed if the value of the variable IV is found either smaller than or equal to the subtraction result (ID−1) or, in any other case, of step 2H is performed. Since the current value of the variable IV is zero and the subtraction result (ID−1) is zero, the processing of step 2D takes place.

Figure 3A:
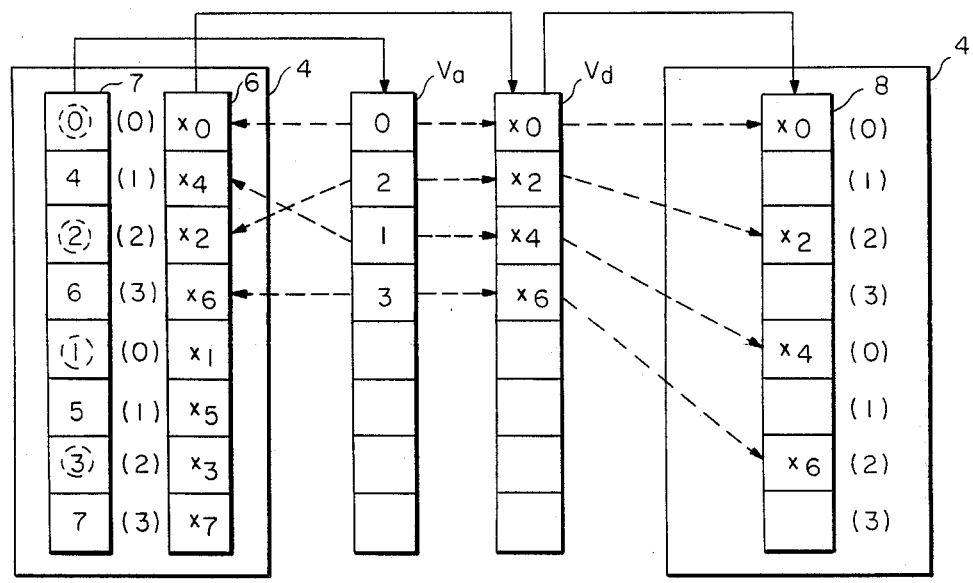
FIGS. 3A and 3B are diagrams for illustrating the flow of vector elements in the embodiment.

At step 2D, the IV-th vector element of the permutation vector to the {IV+( [N/ID] −1)×ID}-th vector element are loaded into the register Va every other vector element. In the embodiment, as shown in FIG. 3A, the zero-th, second, fourth and sixth vector elements of the permutation vector stored in the storage area 7 are loaded into the zero-th through third storage locations of the register Va. In FIG. 3A, parenthesized numerals denote reference numbers of the banks of the memory means 4. Thus, FIG. 3A shows that the elements $x_0$ and $x_1$ are stored in the bank given bank No. 0, the elements $x_4$ and $x_5$ in the bank given bank No. 1, the elements $x_2$ and $x_3$ in the bank given bank No. 2, and the elements $x_6$ and $x_7$ in the bank given bank No. 3.

Then, at step 2E, the elements stored in the vector register Va are used as indices, and those of the elements in the storage area 6 designated by the indices are stored into the register Vd. As a result, the zero-th, second, first and third elements $x_0$, $x_2$, $x_4$ and $x_6$ of the first vector in the storage area 6 are successively loaded in this order into the zero-th through third storage locations of the register Vd. Since the same bank is never accessed consecutively in this process, there occurs no bank conflict.

Further, at step 2F, the elements $x_0$, $x_2$, $x_4$ and $x_6$ stored in the register Vd are successively stored into the zero-th storage location of the storage area 8 to the sixth storage location, every two storage locations. As a result, the elements $x_0$, $x_2$, $x_4$ and $x_6$ are stored into the zero-th, second, fourth and sixth storage locations of the storage area 8.

Next, after the value of the variable IV is increased by one at step 2G, the process returns to step 2C.

Again at step 2C, the value of the variable IV and the subtraction result (ID−1) are compared. Because the current value of the variable IV is one and the subtraction result (ID−1) is one, the processing at step 2D is performed again.

Figure 3B:
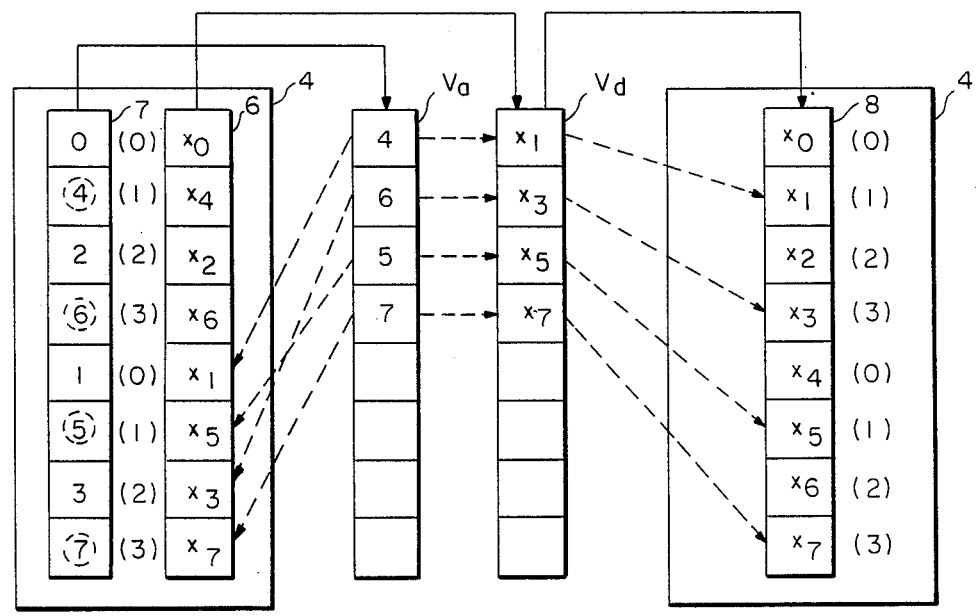
Figure 5:
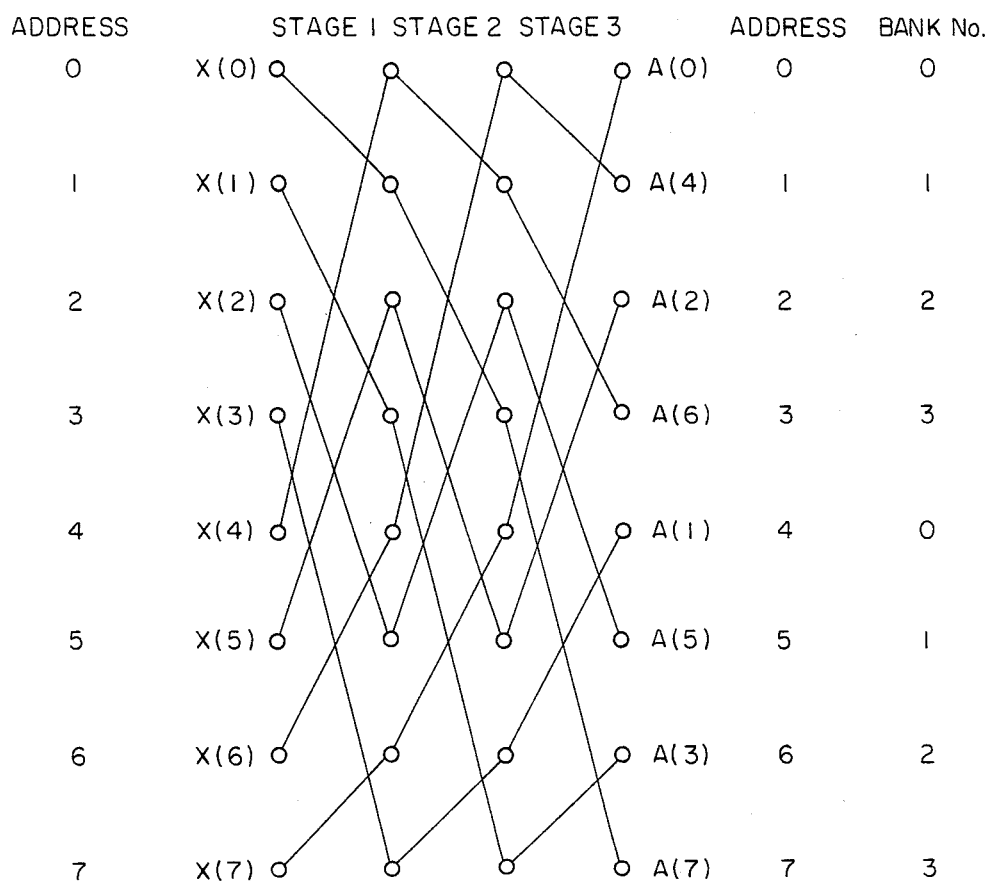
FIG. 5 is a diagram for explaining a method of calculating the FFT.

At step 2D, as shown in FIG. 3B, the first, third, fifth and seventh vector elements of the permutation vector are loaded into the register Va. At step 2E, on the basis of the elements loaded in the register Va, the fourth, sixth, fifth and seventh elements $x_1$, $x_3$, $x_5$ and $x_7$ of the first vector are successively loaded into the register Vd in this order. Here again, no bank conflict occurs. Next, at step 2F, the elements $x_1$, $x_3$, $x_5$ and $x_7$ are stored into the first, third, fifth and seventh storage locations of the storage area 8. Further, after the value of the variable IV is increased by one at step 2G, the process returns to step 2C.

Since the result of comparison at step 2C reveals that the current value of the variable IV is two which is greater than the subtraction result (ID−1), processing at step 2H and second permutation processing at step 2I are performed.

At step 2H, it is determined whether or not all the vector elements of the first vector have been permutated. If the remainder R of division of the vector length N by the interval ID is zero, i.e., Ne=N, it the N elements of the first vector designated by the zeroth through (N−1)-th vector elements of the permutation vector have all been permutated, or the bit reversal processing has been completed. If the remainder R is not zero, i.e., Ne is smaller than N, R elements of the first vector designated by the Ne-th through (N−1)-th elements of the permutation vector have yet to be permutated. In this instance, at step 2I, the Ne-th through (N−1)-th elements of the permutation vector are loaded into the register Va, the elements of the first vector designated by the elements thus loaded are then loaded into the register Vd, and the loaded elements of the first vector are then stored into the Ne-th through (N−1)-th storage locations of the storage area 8.

Thus, the embodiment of the invention is capable of executing the bit reversal processing without giving rise to any bank conflict.

How an optimal access-address interval is determine will now be explained. In a vector processing system of a given hardware construction, usually an optimal, access-address interval ID can be univocally determined from on the length of vectors, such as the above-mentioned first vector, to be processed and the number of banks constituting a MMU in the system. The processing time required together with various access address intervals of each of the various pairs of a given number of banks and a certain vector length each are measured in advance, and the access-address interval which takes the shortest length of processing time is selected as the optimal access-address interval for the pair. FIG. 4 is a table showing the relationship among the optimal access-address intervals determined in this manner, the numbers of banks and the vector lengths. Such a table is stored in the storage area 9 of the memory means 4, and is referred to by the determination means 1. If, for instance, the number of banks and the vector length are 256 and 512, respectively, four is selected as the optimal access-address interval ID.

While this invention has been described in conjunction with the preferred embodiment thereof, it will now be readily possible for those skilled in the art to put this invention into practice in various other manners.

What is claimed is:

1. A method of transforming a bit-reversed order vector in to a natural order vector in a vector processing system comprising: a multi-bank main memory unit including a first vector storage area for holding said bit-reversed order vector, a second vector storage area for storing said natural order vector, a permutation vector storage area for holding a permutation vector, a bank number information storage area for holding bank number information indicative of the number of banks constituting said memory unit, and an interval value storage area for holding respective optimal access-address-interval values for respective pairs of a vector length and a number of banks; and first and second vector registers, said method comprising the following steps:

(a) taking out of said interval value storage area one of said optimal access-address-interval values j designated by one of said pairs corresponding to said bank number information and the length of said bit-reversed order vector;
   (b) loading into said first vector register from an i-th vector element, wherein the initial value of 1 is zero, of said permutation vector every j vector elements;
   (c) loading into said second vector register those vector elements of said bit-reversed order vector held in said first storage area which are addressed by the values of the vector elements loaded into said first vector register;
   (d) storing the vector elements loaded into said second vector register into said second vector storage area from the i-th storage location of said second vector storage area every j storage locations; and
   (e) determining whether or not the processing of said steps (b) to (d) has been repeated j times and, if not, increasing the value of i by one and returning to said step b).

2. A method as claimed in claim 1, further comprising the following steps:

(f) loading into said first vector register, when the repetition of the processing of said steps (b) to (d) by i times is detected at said step (e) and when the remainder of division of the length of said bit-reversed order vector by said interval value j is not zero, all the other vector elements of said permutation vector which have not yet been loaded into said first vector register;
   (g) loading into said second vector register the vector elements of said bit-reversed order vector designated by the vector elements loaded into said first vector register; and
   (h) storing the vector elements loaded into said second vector register into said second vector storage area.

3. A system for transforming a bit-reversed order vector into a natural order vector, comprising:

a main memory having a plurality of banks said main memory storing bank number information;
   a optimal access-address interval determination means for determining an optimal access-address interval of the basis of said bank number information and a bit-reversed order vector length;
   a first vector storage area, located within said main memory, for storing said bit-reversed order vector;
   a second vector storage area, located within said main memory, for storing said bit-reversed order vector;
   a permutation vector storage area, located within said main memory, for storing a permutation vector;
   a bit-reversed order sequence table generation means for performing bit-reversal processing on the basis of said length of said bit-reversed order vector, and for storing a resultant bit-reversed order vector into said permutation vector storage area as a permutation vector;
   a first vector register;
   a second vector register;
   permutation means for receiving information from said optimal access-address interval determination means and information from said first vector storage area and from said permutation vector storage area and for transferring information to and from said second vector register, said permutation means outputting to said second vector storage area a natural order vector in a sequence such that bank conflict does not occur.

* * * * *